(No Model.)
W. H. MAXWELL.
Manufacture of Glass Insulated Telegraph Wires.
No. 243,281. Patented June 21, 1881.
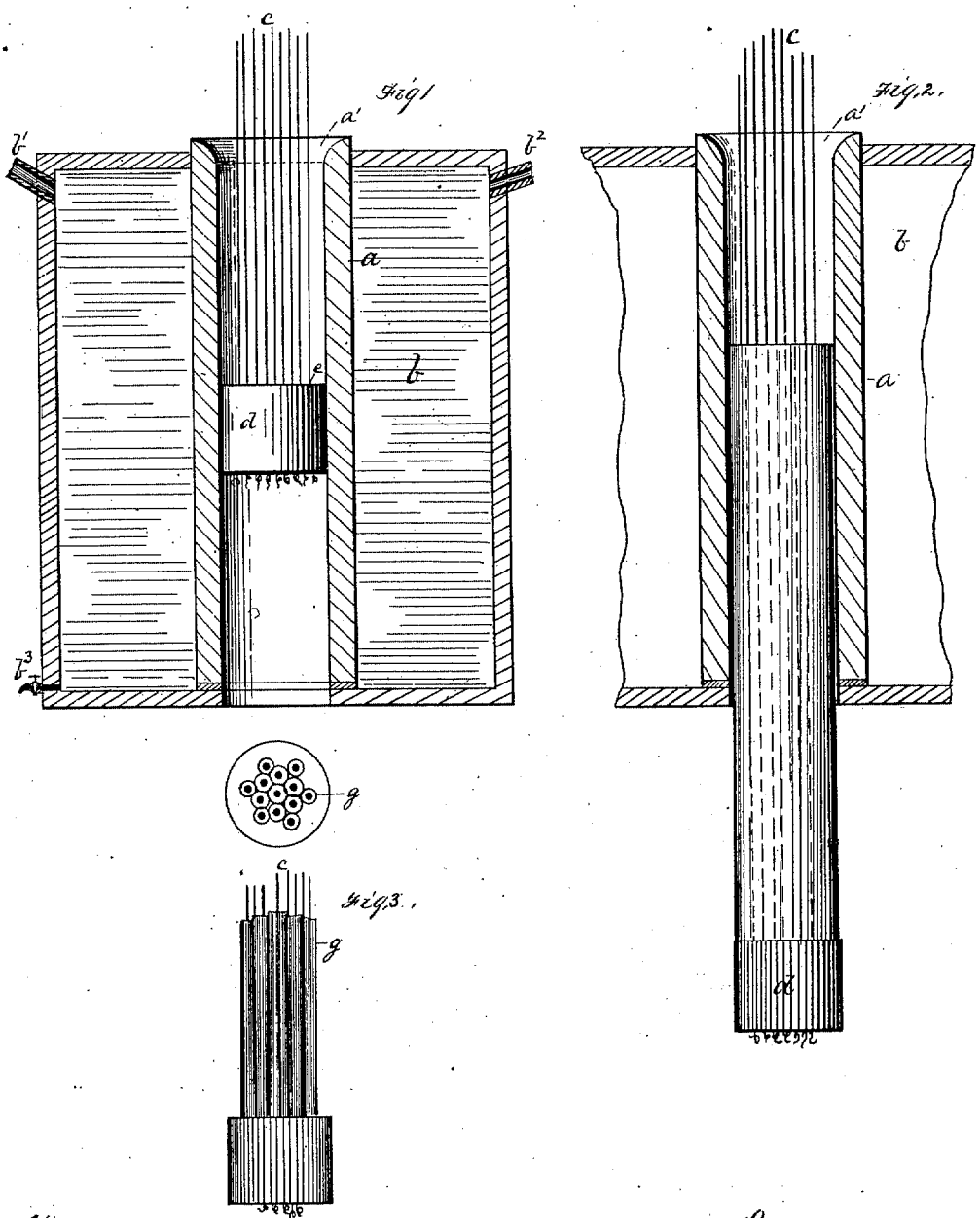

UNITED STATES PATENT OFFICE.

WILLIAM H. MAXWELL, OF PHILLIPSBURG, ASSIGNOR OF TWO-THIRDS TO A. S. TOMPKINSON, OF PHILADELPHIA, PENNSYLVANIA.

MANUFACTURE OF GLASS-INSULATED TELEGRAPH-WIRES.

SPECIFICATION forming part of Letters Patent No. 243,281, dated June 21, 1881.

Application filed March 12, 1881. (No model.)

*To all whom it may concern:*

Be it known that I, WILLIAM H. MAXWELL, of Phillipsburg, in the county of Beaver and State of Pennsylvania, have invented a new and useful Improvement in Manufacture of Glass-Insulated Telegraph-Wires; and I do hereby declare the following to be a full, clear, and exact description thereof.

Various methods have been devised for the production of glass-coated telegraph-wires. It has been proposed to draw the wires through a vessel containing molten glass, which, adhering to them, is to be drawn out with and form an insulating-coating upon them. Glass-coated wires have been placed in wrought-iron tubes, heated, and then drawn out to the desired size and length. Another way has been to embed the wires between glass plates which have been heated and united by pressure. These methods are each open to the objection of too great expense, and the articles produced thereby have not been successfully manufactured in large quantities, and are defective, unless produced with such an amount of care and manipulation as to be too expensive for general or extensive use.

My invention consists of an improved method of and means for forming insulated wire and insulated wire cables, whereby they can be easily and cheaply made.

To enable others skilled in the art to which it appertains to make and use my invention, I will now describe it by reference to the accompanying drawings, in which—

Figure 1 is a vertical section of my improved mold, and illustrates my improved method of making my insulated wire and insulated wire cable. Fig. 2 is another view, illustrating an advanced stage of the method illustrated by Fig. 1; and Fig. 3 illustrates the method of making glass-insulated metallic-incased wire cable, or glass cable when copper or other easily-fused wires are used.

Like letters of reference indicate like parts in each.

I make a metallic mold, $a$, having internally the form of a straight cylinder with a flaring mouth, $a'$, and open at the lower end. This mold is placed in a water-tank, $b$, having inlet, outlet, and drain pipes $b'$ $b^2$ $b^3$, in such a way that the water shall surround and keep its sides cool. The wire or wires $c$ which are to be coated or formed into the cable are placed on a suitable drum or reel above the mold, and their ends passed through and secured in the holes $e$ of a circular disk or block of metal, $d$, which is of suitable size to pass nicely through the mold $a$ and form a movable bottom thereto. The wires $c$ may be fastened to the bottom $d$ by giving them a twist below it. The bottom $d$ is then placed in the mold $a$ a short distance below the flaring mouth, and molten glass is poured into the mold, either directly from a suitable melting-furnace, or from crucibles or ladles, as is practiced in corresponding operations in the casting of steel. When the mold is filled nearly to the top the bottom $d$ is permitted to descend in the mold, the wire being paid out from the reel or drum, and the pouring is continued to keep the mold filled. In this way a cable is formed, the glass as it descends in the mold becoming gradually set, so that when the lower end of the mold is reached it may be permitted to descend still farther until the desired length or section is made. Then the pouring is stopped, and the section thus made is dropped through the mold, the wires cut, the bottom $d$ detached, and the section properly annealed.

The operation I have just described is applicable to the use of iron or steel wire, but not to copper or other easily-fused wire, because the latter would be cut or melted off by the hot glass. When such wire is used I take short lengths, instead of coils, and string upon them glass tubes $g$, Fig. 3. Then, when the molten glass is poured into the mold, as described, it comes in contact with the glass tubes and not the wires, and the tubes protect the wires from being cut by the hot glass.

The last-described method is necessary in surrounding the insulated wires with metal. The wires are first surrounded with the glass tubes $g$, and then the molten metal, whether iron, steel, lead, or other metal, is poured into the mold $a$, around the glass-lined wires, and the block $d$ gradually lowered, as described. In the last case the upper face of the block $d$ may be coated with a suitable coating, if necessary, to prevent the metal from uniting with it. Any desired length of section may be thus made, and any desired number of wires used. If the cable is very heavy, its lower end may be given additional support after it gets beyond the lower end of the mold.

The wires may be made of any suitable metal or metallic alloy. If an easily-fused metal is used, or if an outer metallic casing is desired, the glass tubes $g$ must be used. One wire may be coated or incased in glass or metal, as described, as easily as a number of wires.

The cavity of the mold may be square, or of other desired shape in cross-section, if desired, instead of round. It may be placed in an inclined position, if preferred, instead of a vertical one; but in all cases it must be so placed that the glass or metal will flow downward as it is poured in.

To prevent the glass or metal adhering to the sides of the mold, in case the latter becomes dirty, or for other reason, I line the mold with strips of sheet-iron, asbestus-cloth, or other suitable substance, which, being placed in the mold above the bottom $d$ before it begins its descent, will adhere to the glass or metal first poured in and prevent its sticking to the mold. This difficulty is not likely to occur after the bottom begins to descend, as by that time the inner surface of the mold will be heated and less sticky, and the glass or metal being in motion will not have time to stick.

If desired, the mold may be given a rotary or oscillatory motion on its vertical axis to distribute the molten material and prevent sticking. This may be done by any of the known appliances for such purpose. Also, the movable bottom may be fitted with mechanical appliances for drawing it through the mold, and such appliances may give the additional support to the article before mentioned. They may consist of a vertical standard operated by a rack and pinion from below, or other devices apparent to the skilled mechanic.

The advantages of my improved method are that it is cheap, practicable, and reliable in producing, without the exercise of great skill or care and with great rapidity, any desired length or lengths of insulated wire or insulated wire cable, or metal-incased insulated wire or wire cable.

What I claim as my invention, and desire to secure by Letters Patent, is—

1. The method of making wire cable consisting of casting the wire-enveloping material in a mold upon a gradually-descending bottom, to which the wires are attached, and with which they descend, substantially as and for the purposes described.

2. A mold having a regular vertical or descending cavity, a flaring mouth, and an open lower end, substantially as and for the purposes described.

3. The combination of a mold having a vertical or descending cavity and open lower end with a bottom capable of dropping through the same, substantially as and for the purposes described.

In testimony whereof I have hereunto set my hand.

WILLIAM H. MAXWELL.

Witnesses:
T. B. KERR,
J. K. SMITH.

It is hereby certified that in Letters Patent No. 243,281, granted June 21, 1881, upon the application of William H. Maxwell, for an improvement in the "Manufacture of Glass-Insulated Telegraph-Wires," the name of the assignee of two-thirds interest was erroneously written and printed therein "A. S. Tompkinson" instead of "A. S. Tomkinson;" that the correct name is A. S. Tomkinson; that the proper corrections have been made in the files and records pertaining to the case in the Patent Office, and are hereby made in said Letters Patent.

Signed, countersigned, and sealed this 28th day of June, A. D. 1881.

[SEAL.]

A. BELL,
*Acting Secretary of the Interior.*

Countersigned:
E. M. MARBLE,
*Commissioner of Patents.*